United States Patent
Landram et al.

(10) Patent No.: US 7,598,842 B2
(45) Date of Patent: Oct. 6, 2009

(54) SECURE MOBILE DEVICE AND ALLOCATION SYSTEM

(75) Inventors: Fredrick J. Landram, Pittsburgh, PA (US); Adam M. Petrovich, Pittsburgh, PA (US); Joseph F. Soban, III, Lower Burrell, PA (US)

(73) Assignee: Symbol Technologies, Inc., Holtsville, NY (US)

( * ) Notice: Subject to any disclaimer, the term of this patent is extended or adjusted under 35 U.S.C. 154(b) by 1016 days.

(21) Appl. No.: 10/682,152

(22) Filed: Oct. 9, 2003

(65) Prior Publication Data

US 2005/0077997 A1   Apr. 14, 2005

(51) Int. Cl.
*B60R 25/00* (2006.01)

(52) U.S. Cl. ............ 340/5.73; 340/5.9; 340/5.91; 340/5.92; 340/5.1; 340/5.2; 340/5.7

(58) Field of Classification Search ........... 340/5.73, 340/5.61, 7.48, 825.22, 5.9, 5.91, 5.92, 5.1, 340/5.2, 5.7; 455/410, 575.1, 456.1, 405, 455/409, 418, 420; 379/91.02, 91.01
See application file for complete search history.

(56) References Cited

U.S. PATENT DOCUMENTS

| | | | | |
|---|---|---|---|---|
| 4,951,308 | A * | 8/1990 | Bishop et al. | 379/91.01 |
| 5,266,922 | A * | 11/1993 | Smith et al. | 340/525 |
| 5,455,560 | A * | 10/1995 | Owen | 340/539.32 |
| 5,625,669 | A | 4/1997 | McGregor et al. | |
| 5,774,053 | A * | 6/1998 | Porter | 340/568.1 |
| 6,157,824 | A * | 12/2000 | Bailey | 455/409 |
| 6,344,796 | B1 * | 2/2002 | Ogilvie et al. | 340/568.1 |
| 6,725,303 | B1 * | 4/2004 | Hoguta et al. | 710/106 |
| 7,305,234 | B1 * | 12/2007 | White | 455/418 |
| 2002/0124065 | A1 | 9/2002 | Barritt et al. | |
| 2002/0180582 | A1 | 12/2002 | Nielsen | |
| 2003/0008636 | A1 * | 1/2003 | McGregor et al. | 455/410 |

(Continued)

FOREIGN PATENT DOCUMENTS

DE   100 43 995 A1   3/2002

(Continued)

OTHER PUBLICATIONS

Universal Plug and Play Device Architecture [online], Jun. 2000 [retrieved May 27, 2003]. Retrieved from the Internet: URL: http://www.upnp.org/download/UPnPDA10_20000613.htm.

(Continued)

*Primary Examiner*—Vernal U Brown

(57) ABSTRACT

A system and method of securely allocating mobile devices is disclosed. A plurality of mobile devices are stored in an inoperative state under the control of a host computer. A user enters an identification code, which is received by the host computer, and the host computer selectively places a mobile device in an operative state based on the identification code. If the selected mobile device is not returned within a first predetermined interval, then the selected mobile device is placed back in the inoperative state. If the selected mobile device is not returned within a second predetermined interval, then all data within the selected mobile device's memory is purged. Additionally, the plurality of mobile devices can be stored in a secure area. Access to the secure area is granted based on the identification code.

56 Claims, 8 Drawing Sheets

U.S. PATENT DOCUMENTS

2003/0103088 A1* 6/2003 Dresti et al. ................ 345/835
2003/0195825 A1* 10/2003 Ehrman et al. ................ 705/28

FOREIGN PATENT DOCUMENTS

| EP | 1 067 752 A | 1/2001 |
| EP | 1 223 521 A | 7/2002 |
| GB | 2278758 * | 7/1994 |
| WO | 92/16078 A | 9/1992 |

OTHER PUBLICATIONS

International Search Report regarding corresponding Application No. PCT/US2004/033019 mailed Feb. 10, 2005.

* cited by examiner

SECURE MOBILE DEVICE AND ALLOCATION SYSTEM

TECHNICAL FIELD

The present invention relates generally to mobile computer devices. More particularly, the present invention relates to a system and method in which mobile computer devices are securely allocated to users.

BACKGROUND OF THE INVENTION

In recent years, the use of wireless (e.g., cellular) communication systems having mobile devices which wirelessly communicate with a network, such as a local area network (LAN) and a wide area network (WAN), has become widespread. Retail stores, for example, may provide mobile devices to shoppers to assist them throughout the store, thus minimizing the need for store personnel. Retail stores and warehouses may use wireless communications systems to track inventory and replenish stock. The transportation industry may use such systems at large outdoor storage facilities to keep an accurate account of incoming and outgoing shipments. In manufacturing facilities, such systems are useful for tracking parts, completed products, defects, etc.

Each mobile device typically is preloaded with software to provide both application level and operational level instructional code (referred to generally herein as "operating software"). The mobile device includes one or more processors which execute the operating software, thereby allowing the mobile device to carry out its appropriate functions. The software is stored in memory in the mobile device and may be executed at any time depending on the particular operational needs of the mobile device.

When not in use, mobile devices generally are stored in a docking station or "cradle". The cradle, in addition to performing the storage function, also provides a power connection to the mobile device. The power connection is used by the mobile device to charge on-board batteries and/or to power the mobile device in the event the batteries are exhausted. Additionally, cradles often include a communication interface to allow the mobile device to communicate to other devices, such as a host computer, for example. The communication interface, which typically includes an Ethernet connection, is used to exchange data between the mobile device and the host computer.

Present day mobile devices are hand-held devices that can be transported easily from location to location. Clearly, the "portability" feature of mobile devices will continue to increase as technological advances permit the design and manufacture of smaller and lighter mobile devices. Unfortunately, the reduction in size and weight of mobile devices further increases the likelihood that they may be misplaced and/or stolen. For example, a small mobile device can fall behind a counter or in a box and thus become temporarily or permanently lost. Moreover, the cost of the mobile devices coupled with their small size makes them an attractive target for theft by employees and/or by customers who use them.

Various methods have been implemented to minimize theft of mobile devices. In personal shopping systems (PSS), for example, cradles are designed to physically lock the mobile device in the cradle. The mobile device can be released from the cradle by inserting a release mechanism, such as a store issued card. Once released, the shopper may use the mobile device to shop throughout the store. When the shopper has completed shopping, he or she returns the mobile device to the cradle and the cradle locks the mobile device in place.

A drawback to the above technique for dispensing mobile devices is that it requires specially designed cradles to lock the respective mobile devices. Thus, an entity that wishes to implement such security measures must upgrade all of its cradles. This can involve a significant investment, especially as the number of mobile devices employed by the entity increase. Moreover, such security measures do not prevent a user from walking off with the mobile device once released from the cradle.

In view of the aforementioned shortcomings associated with existing systems and techniques for securing and allocating mobile devices, there is a strong need in the art for a system and method that securely allocates mobile devices to users and yet does not require an upgrade to existing cradles. Additionally, there is a strong need in the art for a system and method that discourages theft of the mobile device, thereby minimizing cost of ownership.

SUMMARY OF THE INVENTION

In the light of the foregoing, the invention relates to a method of securely allocating mobile devices to at least one user. The method includes the steps of storing a plurality of mobile devices in an inoperative state under the control of a host computer; accepting as an input an identification code; and the host computer selectively placing a mobile device among the plurality of mobile devices in an operative state based on the identification code.

A second aspect of the invention relates to a method a method of securely allocating mobile devices to at least one user, including the steps of storing a plurality of mobile devices in a secure area, access to the secure area being under the control of a host computer; accepting as an input an identification code; and the host computer granting the user access to the secure area based on the identification code.

A third aspect of the invention relates to a mobile device allocation system for securely allocating mobile devices to users, including at least one system backbone; at least one host computer coupled to the system backbone; and a plurality of mobile terminals operatively configured to communicate to the host computer through the system backbone, wherein the plurality of mobile devices are stored in an inoperative state, and the at least one host computer and a selected mobile device are operatively configured to place the selected mobile device in an operative state based upon a valid identification code.

A fourth aspect of the invention relates to a mobile device allocation system including at least one secure area; at least one system backbone; at least one host computer coupled to the system backbone; and a plurality of mobile terminals operatively configured to communicate to the host computer through the system backbone, wherein the plurality of mobile devices are stored in the at least one secure area, and the at least one host computer is operatively configured to grant access to the at least one secure area based on a valid identification code.

Other aspects, features, and advantages of the invention will become apparent from the following detailed description. It should be understood, however, that the detailed description and specific examples, while indicating several embodiments of the present invention, are given by way of illustration only and various modifications may naturally be performed without deviating from the present invention.

DESCRIPTION

Figure 1:
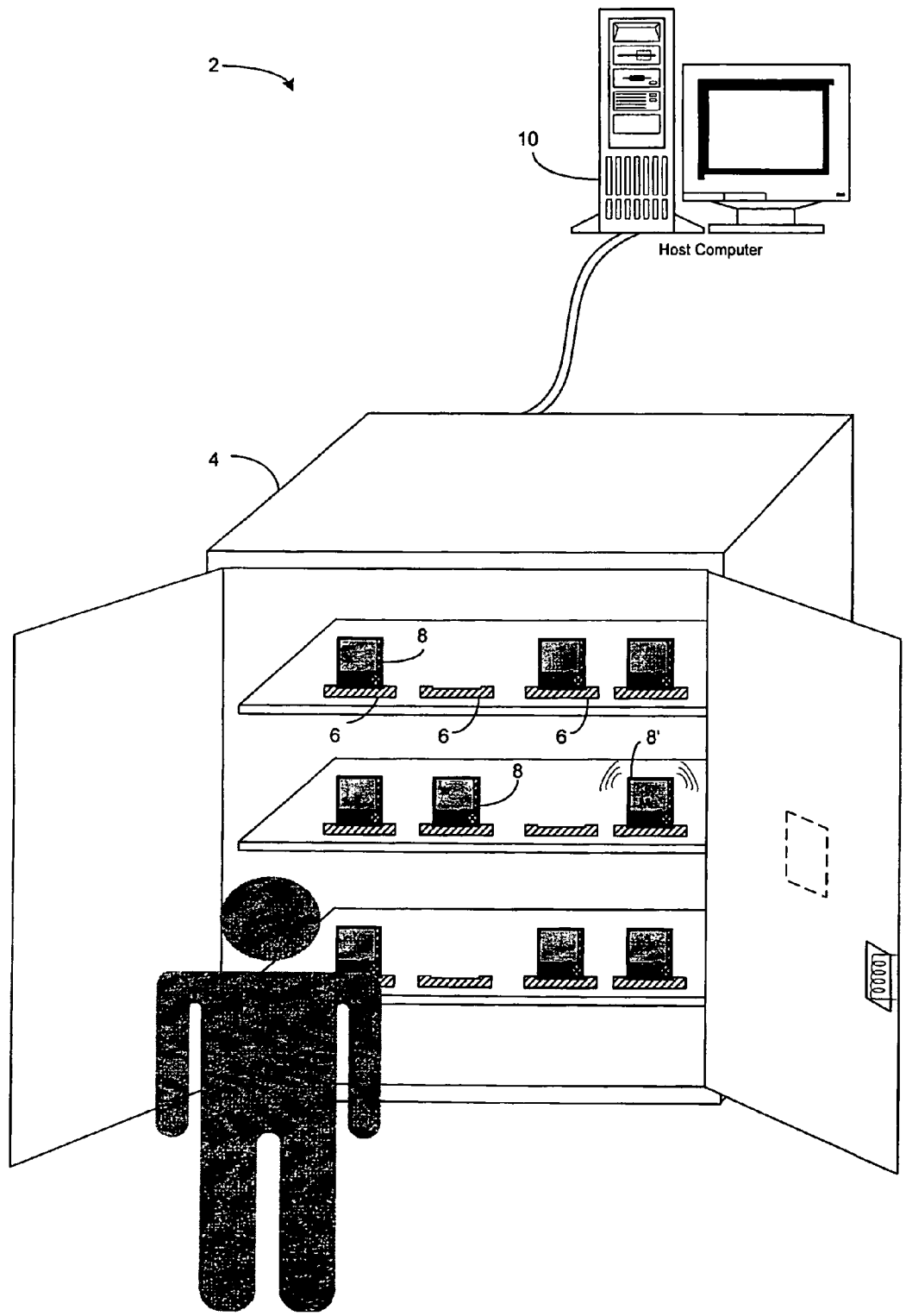
FIG. 1 is an environmental view of a mobile device allocation system in accordance with an exemplary embodiment of the present invention.

The present invention will now be described with reference to the drawings wherein like reference numerals are used to refer to like elements throughout.

As is mentioned above, the present invention relates to the allocation of wireless (e.g., cellular) mobile devices. Such mobile devices can be data terminals, telephones, pagers, etc. In the exemplary embodiment described hereinafter, each mobile device is a mobile data terminal (hereinafter "mobile terminal") used to communicate data such as inventory or the like within a cellular system. However, it is recognized that the invention contemplates other types of mobile devices and is not intended to be limited to systems utilizing mobile terminals.

Referring to FIG. 1, an environmental view of a mobile terminal allocation system 2 in accordance with an embodiment of the invention is illustrated. A security cabinet 4 houses a plurality of cradles 6, and each cradle provides a docking interface for a respective mobile terminal 8. When docked in a cradle 6, the mobile terminal 8 communicates to a host computer 10 through a wireless link 20 or via a network connection 22 through the cradle. Additionally, the mobile terminal receives power through the cradle 6 to charge on-board batteries, for example. As will be described more fully below, a user gains access to the security cabinet 4 by entering a valid identification code. If the code entered by the user is invalid, then the cabinet remains locked and access is denied. If the code is valid, then the security cabinet is unlocked and the user is granted access.

Once the user is granted access, the host computer 10, based on predetermined criteria, will select a mobile terminal 8 for the user. The selected mobile terminal (e.g., 8') will emit an alert, such as an audible and/or visual alert, to signify to the user that he may select that terminal. The user can remove the selected terminal and place it into operation.

Should the user select a mobile terminal different from the one selected by the host computer 10, the user selected mobile terminal 8 will emit an audible and/or visual alarm indicating an improper selection was made. Moreover, the mobile terminal 8 will be in a "locked" state and be inoperative. The alarm will continue until the mobile terminal is returned to a cradle.

The system, in addition to the above locking feature, includes several security features that minimize the risk of loss of the mobile terminal 8 and its data due to theft. As will be described more fully below, if an authorized user does not return the mobile terminal 8' to a cradle 6 within a predetermined interval, the mobile terminal 8' automatically enters the locked state, thus preventing further operation of the mobile terminal. Moreover, the locked state renders the terminal inoperative in other systems, thus reducing the value of the mobile terminal to thieves. Additionally, data contained within memory of the mobile terminal 8' can be purged if the mobile terminal is not returned to the cradle within a second predefined interval. Purging terminal memory minimizes the risk of confidential data being exposed to the public and/or to competitors.

Figure 2:
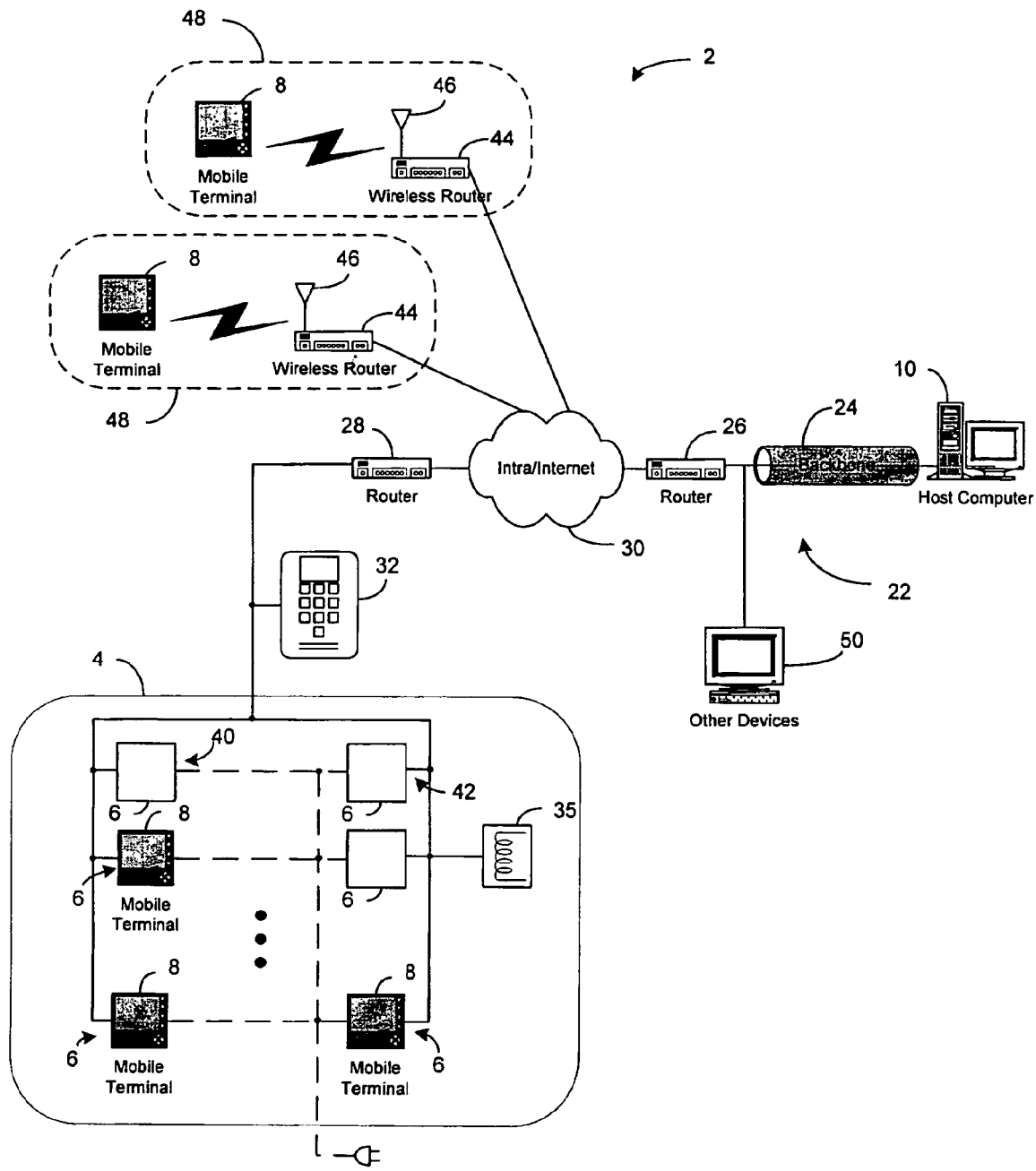
FIG. 2 is a block diagram of a mobile device allocation system in accordance with an exemplary embodiment of the present invention.

Referring now to FIG. 2, the allocation system 2 is shown in detail in accordance with the exemplary embodiment of the present invention. The allocation system 2 includes a network 22 having a system backbone 24. The system backbone 24 may be a hardwired data communication path made of twisted pair cable, shielded coaxial cable or fiber optic cable, for example, or may be wireless in nature. Connected to the system backbone 24 is a first router 26. A second router 28, which can be located remotely or locally relative to the first router 26, is connected to the first router 26 through an internet and/or intranet connection 30. The connection of the first router 26 to the second router 28 via the internet/intranet 30 provides a mechanism through which a communications link can be established to the backbone 24 anywhere internet and/or intranet access is available.

The second router 28 also is connected to an entrance unit 32. As will be described in more detail below, the entrance unit 32 is part of a security module that is used to permit or deny an individual access to a particular area, such as a security cabinet 4 or secure room (not shown). The entrance unit 32, for example, can be a numeric keypad, an alphanumeric keypad, a card scanner, a fingerprint scanner, etc. A user is granted access to the security cabinet 4 by entering the required criteria into the entrance unit 32. For example, if the entrance unit 32 were a numeric keypad, then the user would enter a numeric code. Upon entering a valid code, a lock control unit 35 is instructed to release a locking mechanism (not shown) of the security cabinet 4, thus granting access to the user.

It is noted that although the network connection to the entrance unit 32 and each cradle 6 is shown as a wired connection, the network connection can be configured using wireless communications. A wireless communication link provides an added degree of flexibility, since the components can be moved from their original locations without concern for a wired connection.

The security cabinet 4 houses several mobile terminals 8 each of which are stored in a cradle 6. Each cradle 6 is a conventional cradle and includes a power connection 40 and a communication interface 42. The power connection 40 is used by the mobile terminal 8 when it is stored in the cradle to charge on-board batteries and/or to power the mobile terminal in the event the batteries are exhausted. The communication interface 42 allows the mobile terminal 8 to communicate on the network 22 when the mobile terminal 8 is not in use, e.g., stored in the cradle. In one embodiment, the communication interface 42 is an Ethernet interface.

Several wireless routers 44, which can be located remotely or locally relative to the first router 26 and/or the second router 28, also are connected to the first router 26 through the internet and/or intranet connection 30. Each wireless router 44 is capable of wirelessly communicating with other devices in the system 2 via an antenna 46. A geographic cell 48 associated with each wireless router 44 defines a region of coverage in which successful wireless communication may occur.

The allocation system 2 may include one or more other devices 50 connected to the system backbone 24. Such devices 50 may include work terminals, printers, cash registers, etc. Each mobile terminal 8 communicates with devices on the system backbone 24 via the communication interface 42 of the cradle 6, e.g., when the mobile terminal is stored in the cradle 6, or through the wireless routers 44, e.g., when the mobile terminal is not in the cradle 6.

In the exemplary embodiment, a server computer 10 (also referred to as a server or host computer 10) is responsible for supporting the network activities required to allocate the mobile terminals 8 within the system 2. As part of such function, the server 10 is responsible for granting access to the security cabinet 4, selecting the best mobile terminal 8 for a particular user and unlocking the mobile terminal. Additionally, the server 10 in conjunction with each the mobile terminal 8 assembles and logs particular data regarding each mobile terminal, such as diagnostic data and application data, for example. Finally, the server 10 is responsible for accepting the return of the mobile terminal 8 and, if necessary, upgrading the operating software residing in the mobile terminal 8.

As will be described more fully below, allocation of each mobile terminal 8 includes security measures on both the server 10 and the mobile terminal 8. One level of security includes limiting access to the security cabinet 4, e.g., the requirement of some form of identification, whether it be a fingerprint, a numeric/alpha-numeric code, or identification card. Another level of security includes locking/unlocking and alarming each mobile terminal 8 so that it will be operable once removed from the security cabinet 4. If a locked terminal is removed from the security cabinet 4, the terminal will be inoperable. Yet another level of security includes purging all data within the mobile terminal 8 in the event the mobile terminal is not returned within a specified time period. This minimizes the possibility of sensitive data being released due to a mobile terminal 8 being lost or stolen. Purging of information can occur based on various criteria, including time, successive invalid passwords, etc. For example, all data on the mobile terminal 8 will be purged if the locked mobile terminal is not returned to a cradle 6 within a preset amount of time, e.g., 2 days.

It is noted that the exemplary embodiment illustrates the server 10 performing the allocation of mobile terminals 8, e.g., granting access, locking/unlocking, etc., and the operational management of the mobile terminals, e.g., managing the end user's data and transmitting that data to each mobile terminal based on requests by a user of the mobile terminal. It should be appreciated, however, that the management function and the allocation function can be separated into separate servers, if desired.

Accordingly, a user of mobile terminals, following the teachings disclosed in the present invention, can implement a secure environment wherein mobile terminals only are issued to authorized personnel. Additionally, theft of mobile terminals is discouraged due to security features residing in each mobile terminal and in the server 10. Furthermore, should the mobile terminal be lost or stolen, all confidential data contained on the mobile terminal will be purged, thus minimizing the likelihood the data will fall into the wrong hands. Moreover, such a system can be implemented using existing hardware, thus minimizing costs to the end user.

Figure 3:
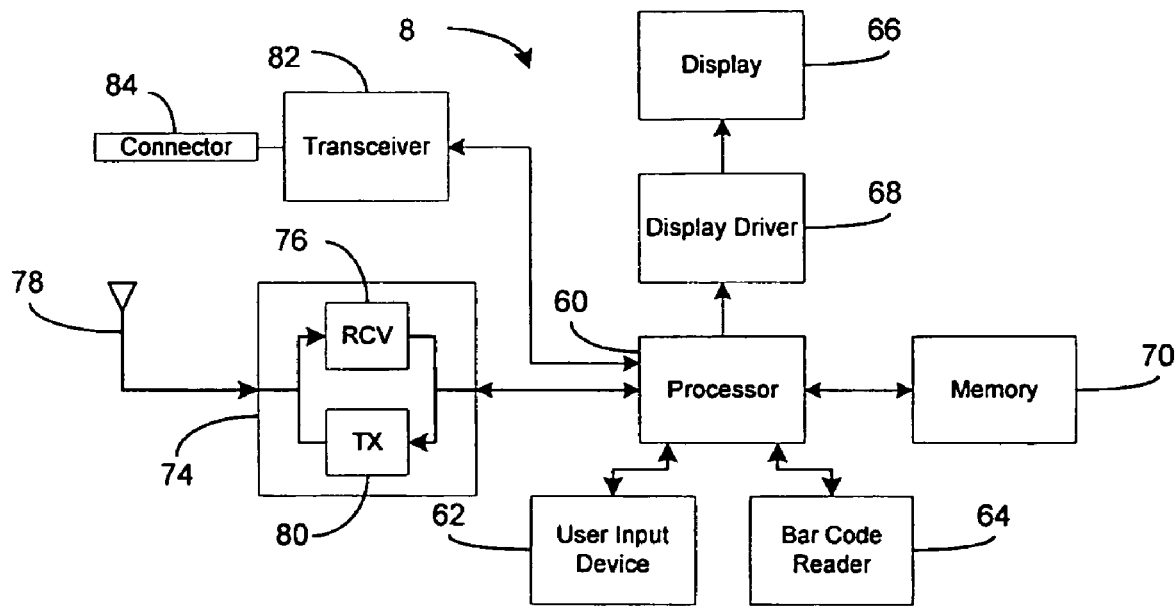
FIG. 3 is a hardware block diagram of a mobile terminal in accordance with the present invention.

FIG. 3 is a block diagram representing the basic structure of each of the mobile terminals according to the exemplary embodiment. Each mobile terminal 8 includes a processor 60 which can be programmed to control and to operate the various components within the mobile terminal 8 in order to carry out the various functions described herein. The processor 60 may be, for example, an AMD Athlon or similar type microprocessor. The processor 60 is coupled to a user input device 62 which allows a user to input data to be communicated to the system backbone 24 such as inventory data, patient information, etc. This information may be sent to the server 10 which serves as a central data location, for example, or to a cash register connected to the system backbone 24, as another example, for providing price information. The input device 62 can include such items as a keypad, touch sensitive display, etc. The mobile terminal 8 also may include a bar code reader 64 coupled to the processor 60 for providing another form of data input. A display 66 also is connected to and controlled by the processor 60 via a display driver circuit 68. The display 66 serves as a means for displaying information stored within the mobile terminal 8 and/or received over the system backbone 24. The display 66 can be a flat panel liquid crystal display with alphanumeric capabilities, for example, or any other type of display as will be appreciated.

Each mobile terminal 8 also includes a memory 70 for storing program code executed by the processor 60 for carrying out the functions described herein. In particular, the memory 70 includes a non-volatile portion (e.g., an EEPROM) for storing mobile terminal operating software which is executed by the processor 60 in order to carry out the desired operations of the mobile terminal 8.

The memory 70 also has stored therein code which is executed by the processor 60 in order to perform the functions for preventing unauthorized use of the mobile terminal and for purging data within the terminal. The actual code for performing such functions can be easily programmed by a person having ordinary skill in the art of computer programming in any of a number of conventional programming languages based on the disclosure herein. Consequently, further detail as to the particular code itself has been omitted for sake of brevity.

Each mobile terminal 8 also includes its own RF transceiver section 74 connected to the processor 60. The RF transceiver 74 generally is used to communicate to devices on the system backbone 24 when the mobile terminal is in normal use, e.g., not in the cradle 6. The RF transceiver section 74 includes an RF receiver 76 which receives RF transmissions from the wireless router 44 via an antenna 78 and demodulates the signal to obtain the digital information modulated therein.

The RF transceiver section 74 also includes an RF transmitter 80. In the event the mobile terminal 8 is to transmit information to the backbone 24 in response to an operator input at input device 62 or as part of its boot-up routine, for example, the processor 60 forms digital information packets which are then delivered to the RF transmitter 80. According to conventional techniques, the RF transmitter 80 transmits an RF signal with the information packets modulated thereon via the antenna 78 to the wireless router 44 with which the mobile terminal 8 is registered.

In addition to the RF transceiver 74, each mobile terminal includes an network adapter transceiver 82 connected to the processor 60. The network adapter transceiver 82 generally is used to communicate to the system backbone 24 when the mobile terminal is not in use, e.g., when the mobile terminal is in the cradle 6. The network transceiver 82 interfaces with the communications interface 42 of the cradle 8 via a connector 84 to form a communication link to the backbone 24.

Figure 4:
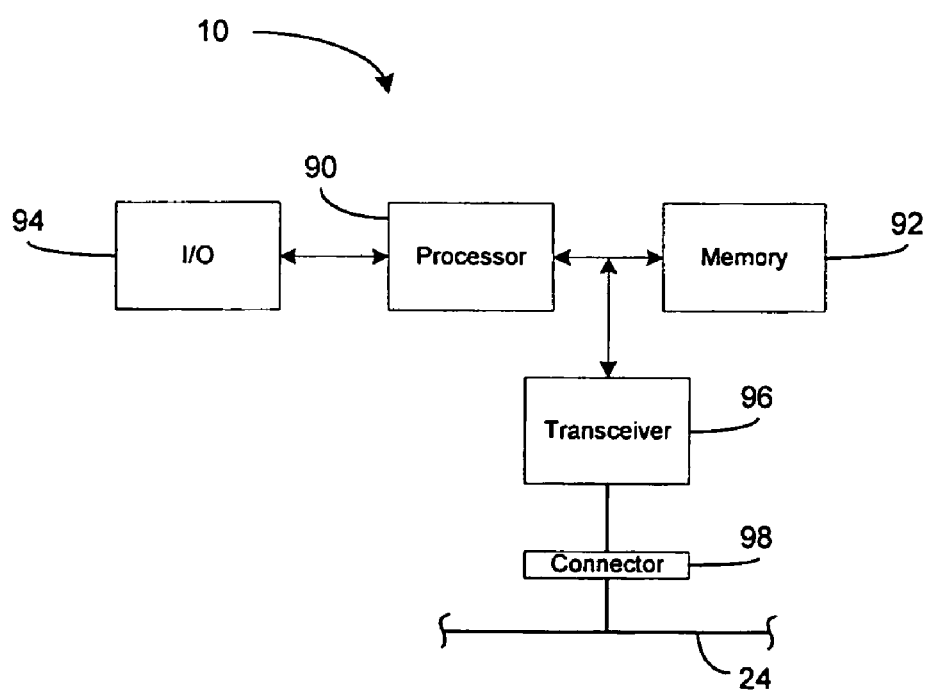
FIG. 4 is a hardware block diagram of a computer server in accordance with the present invention.

Referring now to FIG. 4, a block diagram of the server 10 is provided. The server 10 may be a personal computer, for example, and includes its own processor 90 (e.g., an AMD Athlon XP or Intel Pentium IV® processor). Coupled to the processor 90 is a memory 92 for storing code for controlling the operation of the server 10 in accordance with the description provided herein. The memory 92 may include, but certainly is not limited to, a hard disk storage medium. Again, based on the description provided herein, a person having ordinary skill in the art of computer programming, computer networks and system administration will be able to set up the server 10 to support the various operations described herein. Accordingly, additional detail is omitted.

The processor 90 is coupled to an input/output (I/O) port or device 94 as shown in FIG. 4. The I/O device 94 may include a floppy disk drive or the like which enables a system operator to transfer upgraded software into the memory 92 using conventional file transfer techniques. The processor 90 is coupled to the system backbone 24 by way of a network adaptor transceiver 96 and connector 98 as is conventional. The server 10 is able to transmit and receive information over the system backbone 24 via the transceiver 96 and connector 98.

Figure 5:
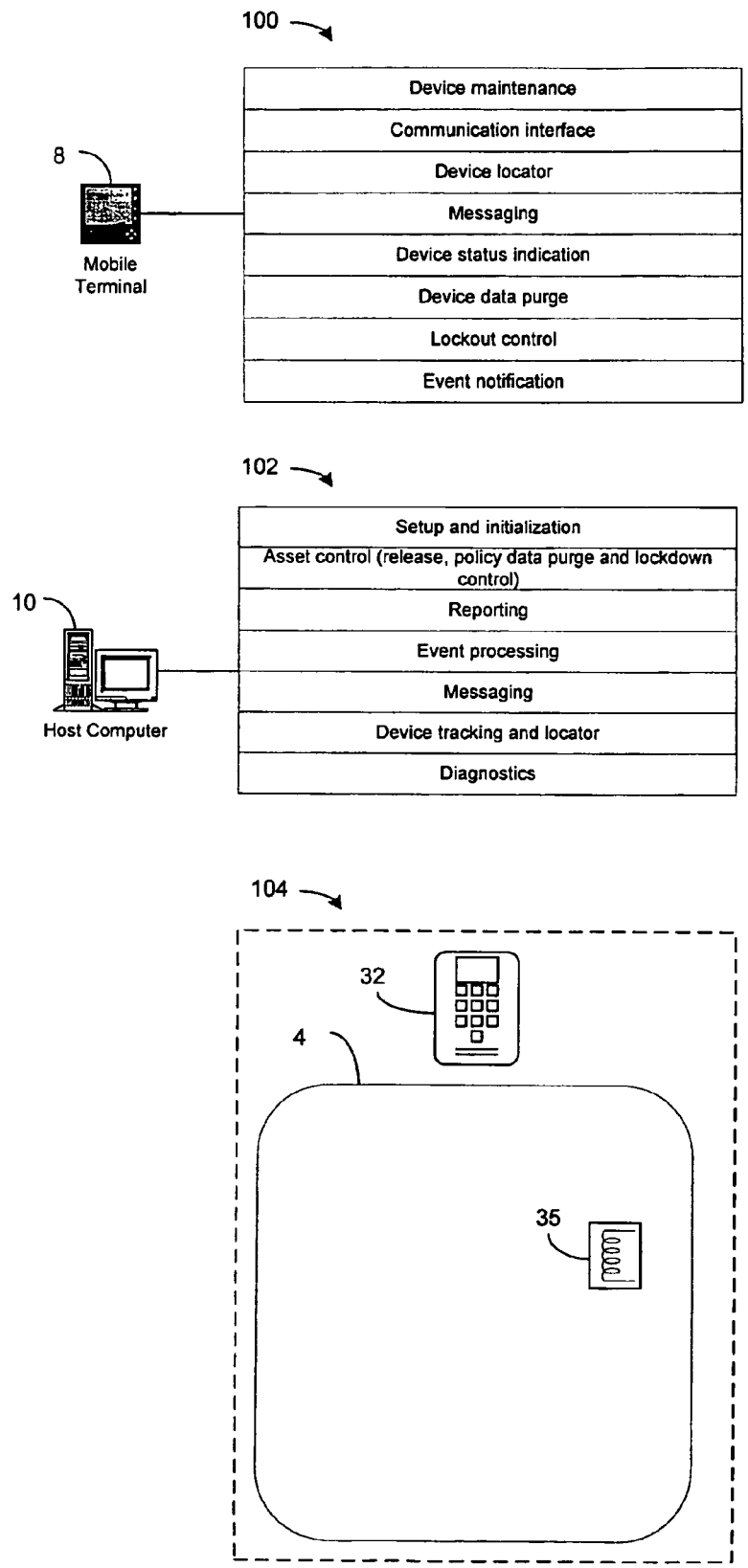
FIG. 5 is a functional block diagram of an asset control client residing on a mobile terminal, an asset control console residing on a server and an access control module in accordance with the present invention.

In addition to the above described hardware relating to the mobile terminal 8 and the server 10, the present invention includes software modules that reside on the mobile terminal and server. Furthermore, a hardware module provides a secure environment for the storage of the mobile terminals. As will be described in more detail below, the software modules, in conjunction with the hardware module, the mobile terminals and the server, form the allocation system of the present invention. Referring to FIG. 5, an overview of each module and their respective functions is illustrated.

A first software module resides in the mobile terminal memory 70 and is referred to as the asset control client 100. The asset control client is a device resident software module that interacts with the asset control console 102, which resides in server memory 92. As will be described more fully below, the asset control client performs numerous tasks associated with the allocation and operation of the mobile terminal, including event notification, device lockout control, device data purge, device status updates, two-way messaging, device maintenance (e.g., battery charging algorithm) and location information/history.

The asset control console 102 (the second software module) resides in server memory 92 and provides a secure management interface to the access control clients and to an access control module 104 (discussed below). The asset control console 102 is used to configure and report on asset control operation. For example, user/policy control (e.g., password administration, who may use the mobile terminal, etc.) of each mobile terminal is configured through the asset control console. The asset control console also collects diagnostic information from each mobile terminal 8 for reporting and/or troubleshooting purposes. The asset control console is accessible via a secure browser over the Internet or via a direct connection to the server 10, if so configured.

A hardware module referred to as the access control module 104 is a physical device that allows a user access to a security cabinet or room. The access control module 104 includes the previously described entrance unit 32, security cabinet 4 and lock control unit 35. An optional sensor (not shown) can be included in the access control module to provide positive feedback of the opening of the security cabinet door.

The entrance unit 32 is the interface between the user and the asset control console. The user enters the required criteria, e.g., numeric code, fingerprint, etc., into the entrance unit, which then transmits the data via the network 22 to the asset control console 102 for verification. The security cabinet 4 is a secure housing that prevent access to the contents stored therein, namely the mobile terminals 8. The lock control unit 35 is a control module that controls a locking mechanism (not shown) of the security cabinet 4. By engaging/disengaging the locking mechanism, access is granted/denied to the security cabinet 4.

As now will be described in more detail, the asset control client 100, the asset control console 102, and the access control module 104 operate together to allocate mobile terminals and manage their operation.

A user obtains a mobile terminal 8 by gaining access to the security cabinet 4. Access to the security cabinet 4 is granted or denied by the asset control console 102. Using the entrance unit 32, a user enters a specific criteria that uniquely identifies him or her as one having authority to obtain a mobile terminal 8. The form of the criteria entered into the entrance unit 32 depends on the type of entrance unit implemented. For example, if the entrance unit 32 is a numeric keypad, then the user would enter a numeric code. The numeric code then is transmitted via the second router 28, the Internet and/or Internet connection 30 and the first router 26 to the server 10, where it is received by the asset control console 102. The asset control console 102, using conventional techniques, checks the code to determine whether the code is valid. If the code is not valid, then access to the security cabinet 4 is not granted. On the other hand, if the code is valid, then access to the security cabinet 4 is granted. Access is granted to the security cabinet 4, for example, by the asset control console 102 instructing the lock control unit 35, via the network 22, to disengage a locking mechanism (not shown) on the door of the security cabinet 4.

It is noted that throughout this disclosure reference will be made to an identification code, and in the exemplary embodiment the identification code is a numeric code. As used herein, however, an identification code is to be construed broadly and includes identification data pertaining to numeric/alpha-numeric codes, voiceprints, fingerprints, iris patterns and the like.

Once the asset control console 102 grants the user access to the security cabinet 4, the asset control console 102 performs several preliminary steps to prepare the mobile terminal 8 for the particular user. First, the asset control console 102 analyzes the available mobile terminals 8 within the security cabinet 4 and, based on specific criteria, selects a mobile terminal 8 for the user. For example, the selection can be based the user's position within the organization, a previous history of use, a particular preference of the user, the available software on each terminal, the current charge state of the terminal's batteries, etc. The asset control console also can customize the mobile terminal 8 for a particular user. For example, a user may have a particular preference for the functions certain keys perform on the mobile terminal 8. These preferences may be different than a standard configuration and/or from the preferences of other users. The asset control console 102, by retrieving information regarding the history of the user, can instruct the asset control client 100 to configure the terminal 8 such that the keys perform the functions preferred by the user. Additionally, the mobile terminal can be configured to display advertisements based on the user's past shopping preferences, such as brand preferences, for example.

After the mobile terminal 8 has been selected and configured for the user, the asset control console 102 issues a release command to the asset control client 100, which unlocks the mobile terminal 8. As used herein, locking and unlocking of the mobile terminal 8 refers to electronic locking and unlocking, and not to physically restraining and releasing the terminal 8. More specifically, a locked mobile terminal 8 is an electronically inoperational mobile terminal, although it is not physically restrained once access has been granted to the security cabinet 4.

To unlock the mobile terminal 8, the asset control console 102 sends a release message via the network 22 to the asset control client 100 of the selected terminal 8. While the mobile terminal is in the cradle 6, all communications are performed through the communications interface 42 of the cradle and the network transceiver 82 of the mobile terminal. Once unlocked, the asset control client 100 causes the mobile terminal to emit an audible and/or visual alert to identify to the user which mobile terminal as been selected by the asset control console 102. The user then removes the indicated mobile terminal 8 from the security cabinet 4 and proceeds to use the terminal. After the mobile terminal is removed from its cradle 6, communications between the asset control client 100 and the asset control console 102 occur via one of the wireless routers 44 (as opposed to the communications interface 42 of the cradle 6 and the network transceiver 82 of the mobile terminal 8). Should the user fail to remove the mobile terminal 8 within a specified time interval, the asset control console 102 will instruct the asset control client 100 to lock the mobile terminal 8.

If the user removes a mobile terminal 8 that is locked, the asset control client 100 of the respective mobile terminal will cause the terminal to emit an audible and/or visual alarm. The audible and/or visual alarm will remain active until the user places the mobile terminal back in a cradle 6 in the security cabinet 4. The audible and/or visual alarm decreases the likelihood of theft of a mobile terminal.

It is noted that while the exemplary embodiment utilizes electronic locking and unlocking of each mobile terminal, a physical locking device, such as a locking cradle, may be employed instead of a standard cradle. When using a locking cradle, the unlock/lock messages are directed to the cradle 6, as opposed to the mobile terminal 8.

In addition to instructing the asset control client 100 to unlock the mobile terminal 8, the asset control console 102 provides additional security information to the asset control client 100, such as the length of time the mobile terminal may be unlocked before it automatically locks operations and/or the length of time the mobile terminal may be away from a cradle 6 before a memory purge is performed, for example. These functions provide an added level of security to the terminal owner, since they minimize the risk of loss of the mobile terminal and/or of any data contained within the mobile terminal.

For example, the asset control console 102 may grant the user a two hour window in which he may use the mobile terminal 8. If the user exceeds this two hour window, then the asset control client 100 automatically locks the mobile terminal, e.g., disables all input and output functions of the mobile terminal 8. If desired, audible and/or visual alarms also may be emitted by the mobile terminal. This condition will continue until the mobile terminal 8 is returned to a cradle 6 within the security cabinet 4.

Accordingly, the mobile terminal 8 is rendered useless after expiration of the specified time limit, thus discouraging theft of the mobile terminal. Moreover, the data within the mobile terminal is purged if the terminal is not returned to a cradle 6 within the specified time period. This reduces the possibility of sensitive information being released to the public and/or a competitor.

The asset control client 100 of the mobile terminal 8, in conjunction with the asset control console 102 of the server 10, perform several functions that can be exercised during operation of the mobile terminal 8. These functions include, for example, event notification, device status, two-way messaging, and location information history.

Event notification includes monitoring various parameters and logging when a particular parameter changes state. For example, the asset control client 100 can monitor when the terminal 8 was released from the cradle 6 and when the terminal 8 was returned to the cradle. Such information is stored in memory 70 of the mobile terminal and includes the particular event along with a time and date stamp indicating when the event occurred. The event information is transmitted to the asset control console 102 when the mobile terminal is placed back in a cradle 6. Alternatively, the data can be transmitted wirelessy to the asset control console via the wireless router 44, for example.

The asset control client 100 can provide feedback relating to the status of components within the mobile terminal 8. For example, the battery level and/or the memory utilization of the mobile terminal 8 can be viewed on the display 66. Other exemplary status parameters include communications signal strength, time away from cradle, time remaining before lock down, etc. Again, such status information is stored in memory 70 of the mobile terminal and transmitted to the server when the mobile terminal is placed back in a cradle 6 or wirelessly via the wireless router 44 when available.

The asset control client 100 and asset control console 102 also support two-way messaging between mobile terminals. Using conventional techniques, the asset control console 102 configures each asset control client 100 within two respective mobile terminals such that they will have a communication link between them. The actual communication link between mobile terminals can be direct, e.g., from mobile terminal to mobile terminal, or indirect, e.g., from mobile terminal to server to mobile terminal. Once configured, each mobile terminal can roam anywhere in the system while maintaining a communication link to the other mobile terminal. If a first user wishes to ask a second user a question, he simply types the message into his mobile terminal via the user input device 62, and the asset control client 100 will transmit the message to the designated second mobile terminal. The asset control client of the second terminal will receive the message and proceed to send it to the display 62 of the second mobile terminal.

Another feature of the invention is tracking and logging of mobile terminal activity. As the mobile terminal 8 is operated by a user, the mobile terminal's location is monitored by the asset control console 102. Each location is stored in the server memory 92 for future reporting and/or maintenance issues. For example, the asset control console 102 determines the location of the mobile terminal based on which wireless router 44 is used to communicate to the asset control console. Since each wireless router 44 communicates in a specific geographic cell 48, the location of the mobile terminal 8 can be isolated to an area within the respective geographic cell. As the mobile terminal is moved from cell to cell, the asset control console 102 logs each movement. The log can be used to ascertain a pattern of a particular user or, in the event of a misplaced terminal, the last known location of the mobile terminal. In the event that the mobile terminal is lost or misplaced, the asset control console can send a message instructing the asset control client 100 to emit a beep or tone to assist in locating the mobile terminal 8.

Once a user is finished using the mobile terminal, he will return it to the security cabinet 4. To return the mobile terminal, the user once again must gain access to the security cabinet 4. As before, the user enters some specific criteria into the entrance unit 35 that uniquely identifies him or her. The asset control console verifies the criteria, e.g. a numeric code, and if the code is valid, the user is granted access to the security cabinet 4 and he places the mobile terminal in an open cradle. Alternatively, the asset control console 102 may request that the user enter an identification code for the particular mobile terminal being returned. The identification code can be scanned in using a bar code reader, for example, and can be an asset tag number of the mobile terminal as is conventional.

Once the device is returned to a cradle, the asset control console 102 sends a message to the asset control client 100 instructing the client 100 to lock the mobile terminal 8. Additionally, a synchronization occurs between the asset control console 102 and the asset control client 100 as is conventional. The synchronization includes transmitting data (e.g., event information, device usage, diagnostic information, etc.), from the mobile terminal memory 70 to the asset control console 102. Once the data is transferred, the asset control console 102 stores the information in server memory 92 for reporting at a later time. Furthermore, the batteries of the mobile terminal are recharged, and the charge level of the batteries is monitored by the asset control console 102.

Prior to releasing the particular mobile terminal to another user, the asset control console 102 checks whether the operating software of the mobile terminal 8 requires an update. If an update to the operating software is available, the asset control console 102, using conventional techniques, transmits the new operating software to the mobile terminal via the network 22. The processor 60 of the mobile terminal then proceeds to install the new operating software.

As will be appreciated, the above described functions, using the flow charts of FIG. 6-FIG. 7, easily can be programmed by a person having ordinary skill in the art of computer programming in any of a number of conventional programming languages based on the disclosure herein.

Figure 6A:
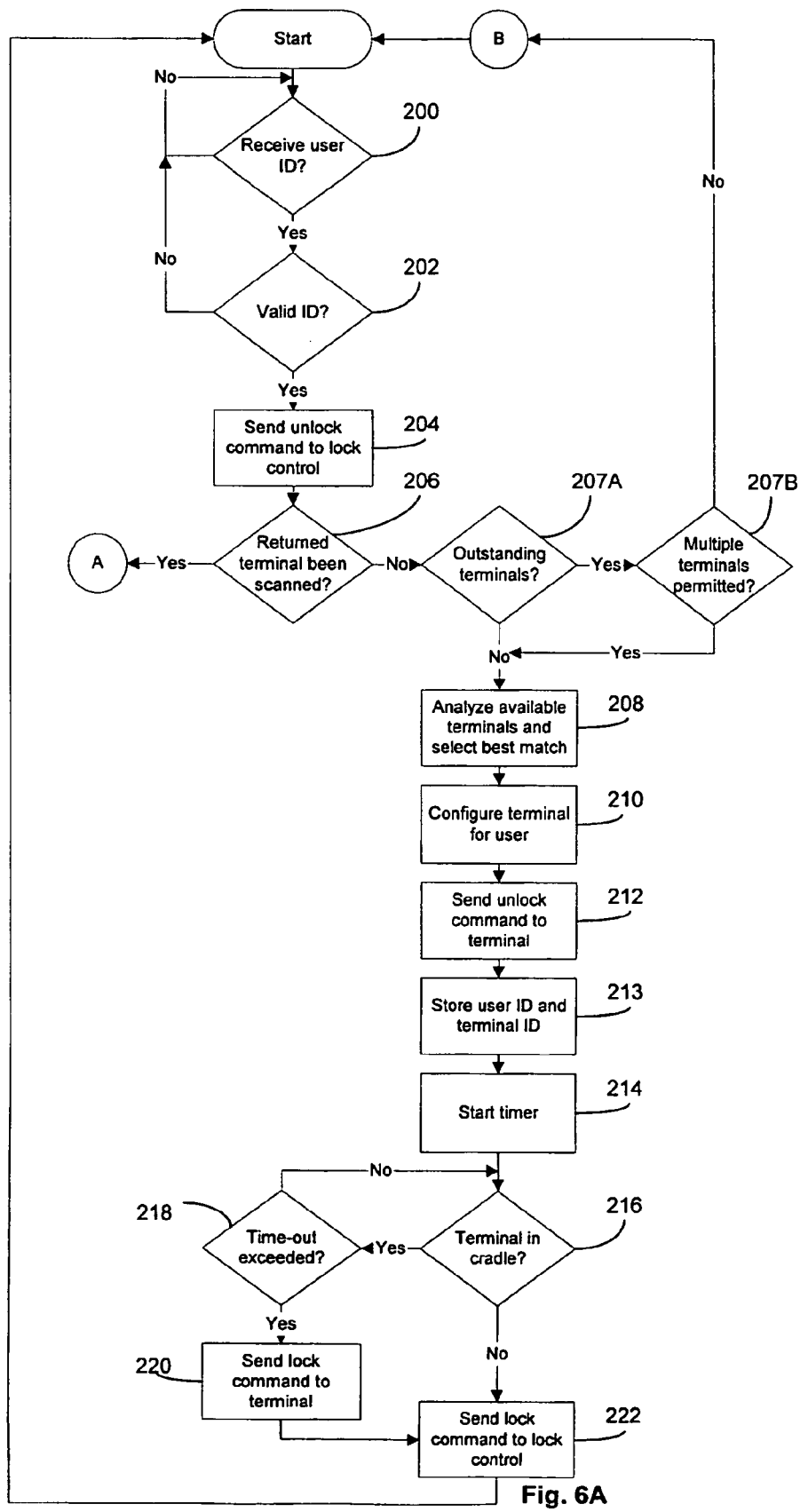
FIG. 6A is a system flowchart suitable for programming the asset control console function on a computer in accordance with the present invention.
Figure 6B:
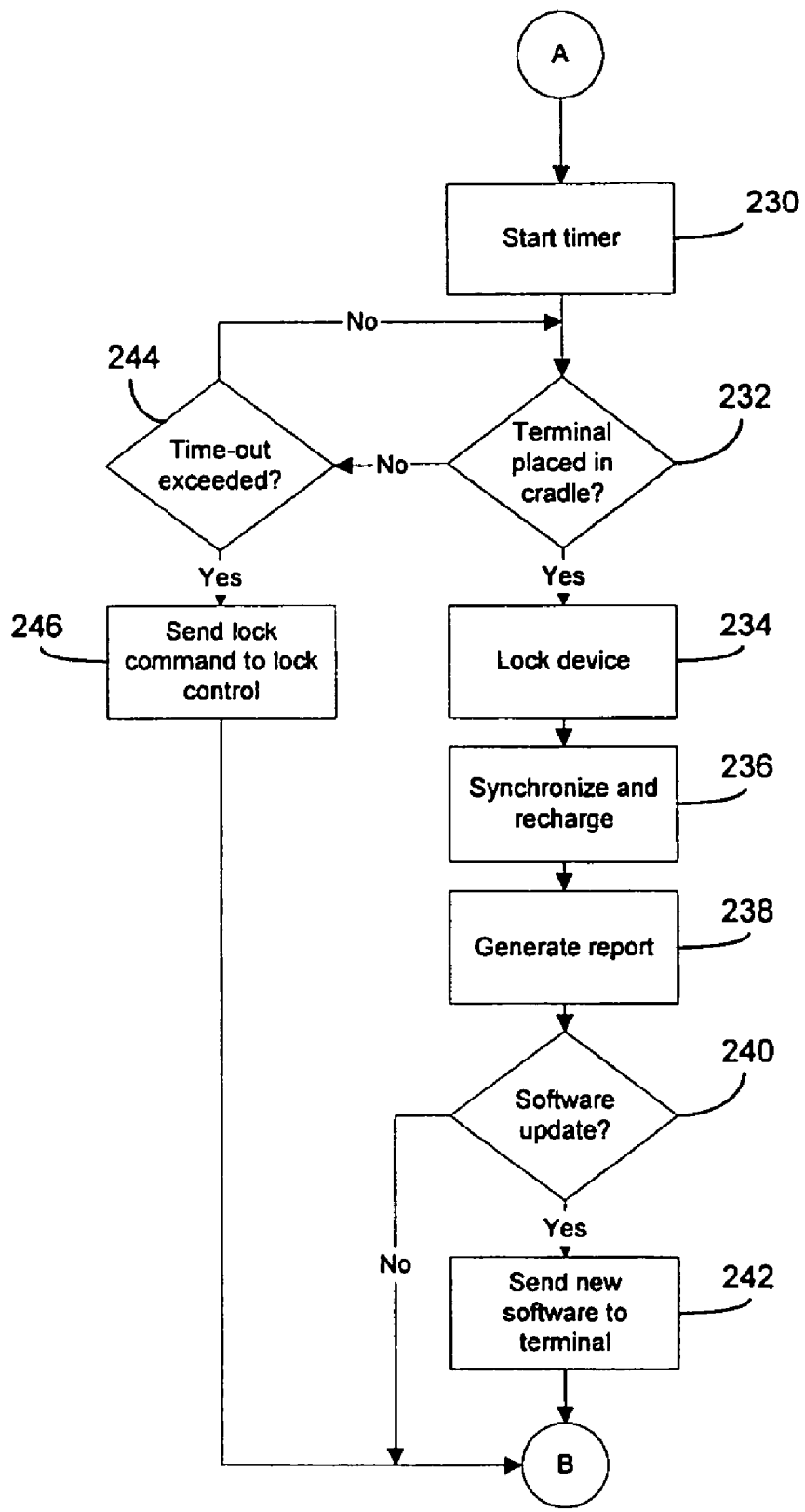
FIG. 6B is a continuation of the flow chart of FIG. 6A.

FIG. 6A and FIG. 6B illustrates the basic operation of the asset control console 102 of the server 10 in accordance with the procedures described above. Beginning at step 200 the processor 90 determines whether a user identification code has been entered at the entrance unit 32. If an identification code has not been entered, the processor 90 continues scanning for an identification code. When the processor 90 detects that an identification code has been entered, the processor, using conventional techniques, proceeds at step 202 to check the validity of the identification code. If the identification is not valid, the processor 90 moves back to step 200 and awaits a new identification code. If the processor determines that the identification code is valid, then at step 204 the processor 90, via the network 22, sends a message to the lock control unit 35 instructing the lock control unit to disengage the locking mechanism (not shown), thus granting the user access to the security cabinet 4.

Moving to step 206, the processor 90 determines whether the user is returning a terminal 8. For example, when a user returns a previously issued mobile terminal, the user enters an identification code of the terminal, e.g., an asset tag number, into the system using a bar code scanner (not shown). The processor receives the scanned identification number and thus determines a terminal is being returned. If the processor 90 determines that the user is not returning a terminal, then at step 207A the processor checks whether the user has any outstanding terminals issued to him. As will be described below with reference to step 213, each time a user is issued a terminal, the user's identification code along with the mobile terminal identification code are stored in memory. The processor 90 at step 207A checks memory to determine whether a mobile terminal previously has been issued a user. If the user does not have any outstanding terminals, then the processor moves to step 208. If the user does have outstanding terminals, then the processor at step 207B determines whether the particular user may be issued multiple terminals. For example, certain users may be permitted to have multiple terminals issued to their identification code, e.g., a floor supervisor, while other users may not, e.g., a warehouse clerk. If the user is not permitted to have multiple terminals, then the processor moves back to step 200 and denies the user from obtaining another terminal. If the user is permitted to have multiple terminals, then the processor moves to step 208.

At step 208 the processor checks all mobile terminals currently stored in the security cabinet 4 to find a best match for the particular user. In determining the best match, the processor checks various parameters, such as battery charge, available software on the terminal, user preferences, etc. Once a best match is found, the processor 90 at step 210 sends configuration data to the selected terminal 8. The configuration data includes, for example, the preferences of the particular user, the length of time the terminal 8 may be used, the length of time the terminal may be away from a cradle 6 before a data purge is performed, etc.

Moving to step 212, the processor 90, via the network 22, instructs the asset control client 100 of the mobile terminal 8 to unlock the mobile terminal 8. At step 213, the processor 90 stores the user identification code and an identification code corresponding to the selected terminal 8 in memory 92. Moving to step 214, the processor 90 starts a first timer. The first timer is a preset time delay that provides a window of time during which the user can remove the selected terminal 8 from the cradle in the unlocked state. At step 216, the processor checks whether the selected mobile terminal has been removed from the cradle. If the terminal is in the cradle, the processor 90 at step 218 checks whether the first timer has expired. If the first timer has not expired, the processor proceeds back to step 216. If the first timer has expired, then the processor at step 220 sends a lock command to the asset control client 100 and proceeds to step 222. At step 222, the processor 90 instructs the lock control unit 35 to lock access to the security cabinet 4 and the processor moves back to step 200 to monitor for another user identification code.

Moving back to step 216, if the selected mobile terminal has been removed from the cradle, the processor 90 directly moves to step 222 and instructs the lock control unit 35 to lock the security cabinet 4. As described above, after the processor has completed step 222, the processor moves back to step 200 to monitor for another user identification code.

Moving back to step 206, if the processor 90 determines that the user is returning a mobile terminal, then at step 230 of FIG. 6B the processor 90 starts a second timer. The second timer provides a window in which the security cabinet will remain unlocked, thus allowing the user to return the mobile terminal 8 to a cradle 6. At step 232, the processor checks whether the mobile terminal has been placed in a cradle. If the terminal 8 has been placed in a cradle, then at step 234, the processor sends a message to the asset control client 100 to lock the mobile terminal 8. At step 236, the processor 90 sends a request to the asset control client to synchronize data on the mobile terminal 8 with data on the server 10 as is conventional. Once synchronization is complete, the processor at step 238 generates a report (if desired). The report can include, for example, device usage statistics, diagnostic information, user preferences, etc. At step 240, the processor 90 determines whether operating software updates are available for the mobile terminal. If operating software updates are available, the processor 90 at step 242, using conventional techniques, transfers new operating software to the mobile terminal 8 and moves back to step 200. If operating software updates are not available, the processor directly moves to step 200.

Moving back to step 232, if the mobile terminal 8 has not been placed in a cradle, then at step 244 the processor checks whether the second timer has expired. If the second timer has not expired, then the processor moves back to step 232. If the second timer has expired, then the processor 90 at step 246 instructs the lock control unit 35 to engage the locking mechanism, and the processor moves back to step 200.

Figure 7A:
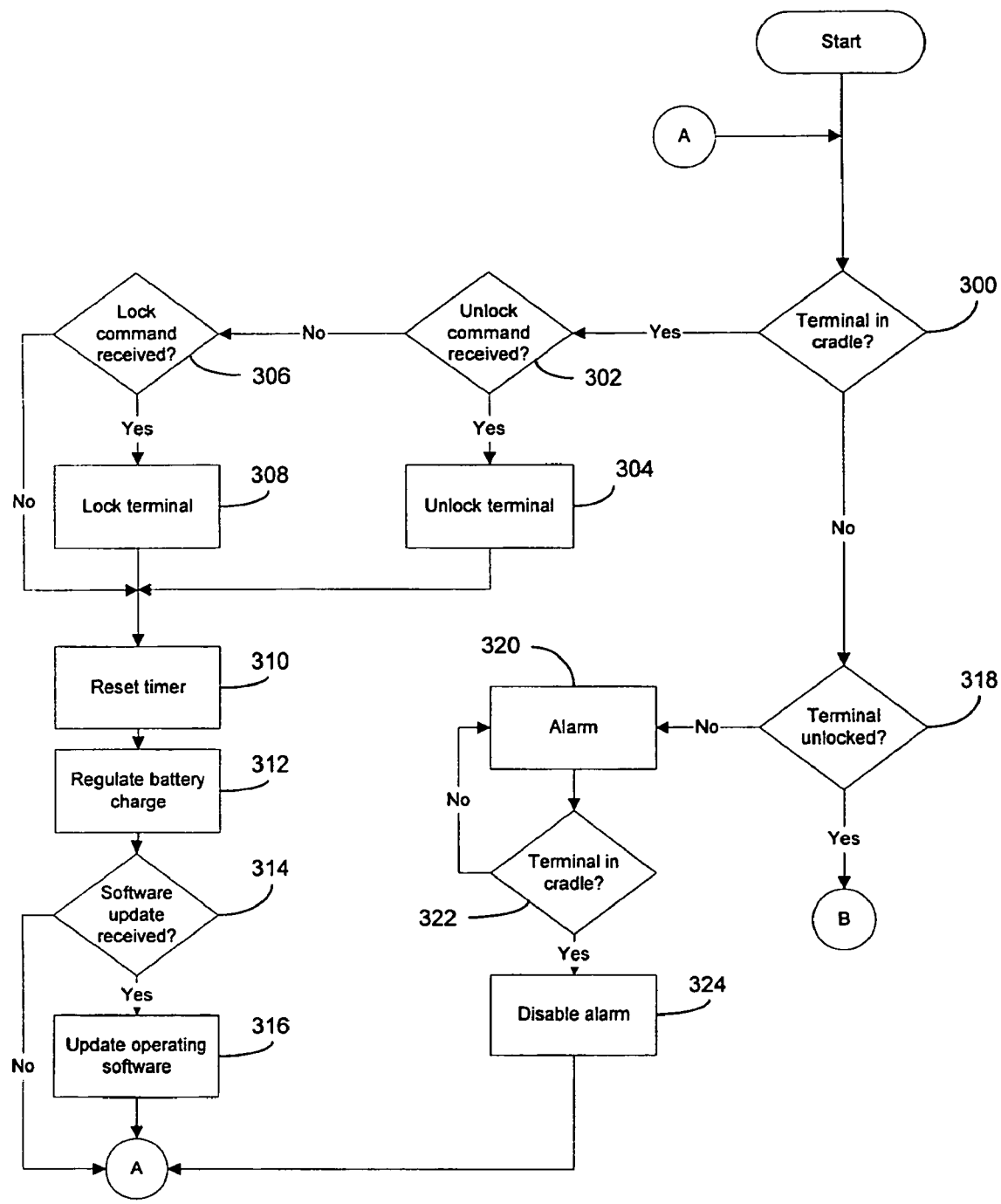
FIG. 7A is a system flowchart suitable for programming the asset control client function on a mobile device in accordance with the present invention.
Figure 7B:
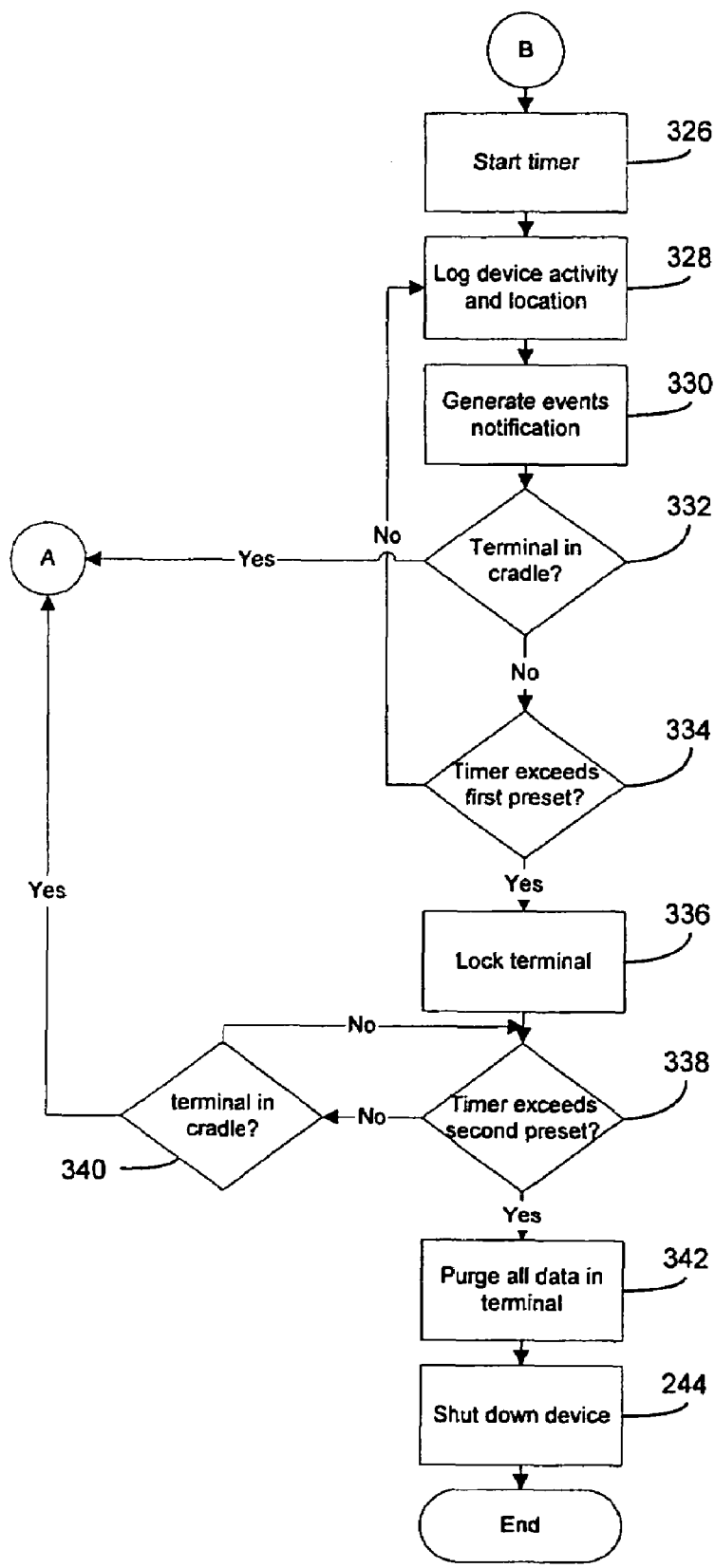
FIG. 7B is a continuation of the flow chart of FIG. 7A.

FIG. 7A and FIG. 7B illustrate the basic operation of the asset control client 100 of the mobile terminal 8. Beginning at step 300, the processor 60 determines whether the mobile terminal 8 is in a cradle 6. If the mobile terminal is in a cradle, then at step 302 the processor 60 determines whether an unlock command has been received from the asset control console 102 of the server 10. If an unlock command has been received, then at step 304 the processor proceeds to unlock the mobile terminal, e.g., enable the mobile terminal for operation. If, on the other hand, the processor 60 determines that an unlock command has not been received, then the processor moves to step 306 and determines whether a lock command has been received from the asset control console 102. If a lock command has not been received, then the processor moves to step 310. If a lock command has been received, then at step 308 the processor 60 locks the mobile terminal 8, e.g. disables the mobile terminal, and moves to step 310.

At step 310, the processor resets an internal timer. The timer is used by the processor to determine whether the mobile terminal has been in use in excess of an allotted time period (and thus should be locked) and/or whether the mobile terminal has been away from a cradle in excess of an allotted time period (and thus all memory should be purged). As long as the mobile terminal is in the cradle, the timer is not released for timing. At step 312, the processor checks the charge level of the battery and adjusts the charge rate as necessary. Moving to step 314, the processor 60 checks whether an operating software update has been received from the asset control console 102. If an update has not been received, then the processor moves back to step 300. If an update has been received, then at step 316 the processor proceeds to install the operating software update and then moves back to step 300.

Moving back to step 300, if the processor 60 determines the mobile terminal 8 is not in a cradle, the processor 60 at step 318 checks whether the mobile terminal is unlocked. If the mobile terminal is not unlocked, then at step 320 the processor causes the mobile terminal 8 to emit an alarm. The alarm is an indication that the mobile terminal improperly was removed from the cradle, and may include both audible and visual alerts. At step 322, the processor 60 checks whether the mobile terminal has been placed back in a cradle. If the mobile terminal has not been placed in a cradle, then the processor moves back to step 320 and the alarm continues. If the mobile terminal has been placed back in a cradle, then at step 324 the processor causes the alarm to cease and the processor moves back to step 300.

Moving back to step 318, if the mobile terminal is unlocked, then at step 326 of FIG. 7B the processor starts the internal timer. At step 328, terminal activity is logged by the processor into memory 70 of the mobile terminal. Activity that is logged includes, for example, device diagnostics, device location and user preferences. At step 330, the processor checks the status of particular events and logs each occurrence of an event. Exemplary events include removal from the cradle, return to cradle and low battery charge. At step 332, the processor checks whether the mobile terminal 8 has been returned to a cradle. If the mobile terminal has been returned to a cradle, then the processor moves to step 300. If the mobile terminal has not been returned to a cradle, then the processor proceeds to step 334.

At step 334, the processor checks the timer against a first preset time. The first preset time is received from the asset control console 102 during configuration and determines the length of time the mobile terminal 8 may be used before it automatically enters lock mode. If the timer does not exceed the first preset time, then the processor moves back to step 328 and the user may continue to operate the mobile terminal 8. If the timer exceeds the first preset time, then the processor at step 336 proceeds to lock the mobile terminal. At step 338, the processor 60 determines whether the timer exceeds a second preset time. The second preset time also is received from the asset control console 102 during configuration and determines the length of time the mobile terminal 8 may be away from a cradle 6 before a data purge is performed. A data purge clears all data within the memory 70 of the mobile terminal. If the timer does not exceed the second preset time, then at step 340 the processor checks whether the mobile terminal has been returned to a cradle. If the mobile terminal has been return to a cradle, then the processor moves back to step 300. If the mobile terminal has not been returned to a cradle, the processor moves back to step 338.

Moving back to step 338, if the processor 60 determines that the timer exceeds the second preset time, then at step 342 the processor purges all data within memory 70 of the mobile terminal 8. At step 344, the processor 60 shuts down the terminal 8, thus preventing any further unauthorized use of the terminal. The terminal may be placed back in service, for example, by entering a code into the terminal that is known only by the terminal owner. Upon entering the correct code, the terminal can be placed back in operation. However, all data within the terminal will be lost.

Although the invention has been shown and described with respect to certain preferred embodiments, it is obvious that equivalents and modifications will occur to others skilled in the art upon the reading and understanding of the specification. The present invention includes all such equivalents and modifications, and is limited only by the scope of the following claims.

What is claimed is:

1. A method of securely allocating mobile devices to at least one user, comprising the steps of:

storing a plurality of mobile devices in an inoperative state under the control of a host computer, each of the plurality of mobile devices in communication with the host computer while in the inoperative state;

the host computer accepting as an input an identification code that uniquely identifies the at least one user;

the host computer selectively placing a mobile device among the plurality of mobile devices in an operative state based on the identification code; and the host computer customizing operation of the selected mobile device to preset preferences of the at least one user, wherein customizing includes configuring keys of the mobile device to preset functional preferences of the at least one user.

2. The method of claim 1, further comprising the steps of: storing the plurality of mobile devices in a secure area; and granting a user access to the secure area based on the identification code.

3. The method of claim 2, wherein the step of storing the plurality of mobile devices in a secure area includes storing the plurality of mobile devices in a secure enclosure.

4. The method of claim 2, wherein the step of storing the plurality of mobile devices in a secure area includes storing the plurality of devices in a secure room.

5. The method of claim 2, wherein the step of granting access to the secure area based on the identification code includes identification codes selected from the group consisting of numeric codes, alpha-numeric codes, voiceprints, fingerprints and iris patterns.

6. The method of claim 1, further comprising the step of: selecting a mobile device from the plurality of mobile devices that will be placed in an operative state based on a preselected criteria.

7. The method of claim 6, wherein the step of selecting a mobile device from the plurality of mobile devices that will be placed in an operative state based on a preselected criteria includes criteria selected from the group consisting of prior history of use, position within an organization, current battery charge level, and available software on the device.

8. The method of claim 1, further comprising the step of: configuring the operational mobile device to be operational for a first interval, where upon expiration of the first interval the mobile device becomes inoperational.

9. The method of claim 8, further comprising the step of: configuring the operational mobile device to retain data within a memory area for a second interval, where upon expiration of the second interval all data within the memory area is purged.

10. The method of claim 9, further comprising the step of: returning the mobile device to the secure area prior to the expiration of the second interval, thereby preventing the data stored in the memory area from being purged.

11. The method of claim 1, further comprising the step of: configuring the operational mobile device to retain data within a memory area for a first interval, where upon expiration of the first interval all data within the memory area is purged.

12. The method of claim 1, further comprising the step of: monitoring when an updated revision of mobile device operating software is available; and upgrading each mobile device with the updated revision of operating software.

13. The method of claim 1, further comprising the step of: displaying an advertisement on the selected mobile device based on a previous shopping history of the at least one user.

14. The method of claim 1, further comprising the step of: emitting an alarm when the user selects a mobile device that is in the inoperative state.

15. The method of claim 14, wherein the step of emitting an alarm includes emitting an audible alarm.

16. The method of claim 14, wherein the step of emitting an alarm includes emitting a visual alarm.

17. The method of claim 1, further comprising the step of: establishing a communication link between a first selected mobile device and a second selected mobile device, wherein messages are exchanged between the users of each mobile device.

18. The method of claim 17, wherein the step of establishing a communication link includes communicating directly from the first mobile device to the second mobile device.

19. The method of claim 17, wherein the step of establishing a communication link includes communicating indirectly from the first mobile device to the second mobile device.

20. The method of claim 19, wherein the step of communicating indirectly includes communicating from the first mobile device to the host computer to the second mobile device.

21. The method of claim 1, further comprising the step of: tracking the location of the selected mobile device as the selected mobile device moves between a plurality of cells.

22. The method of claim 21, wherein the step of tracking the location of the selected mobile device includes storing the selected mobile device location in a memory.

23. The method of claim 1, further comprising the step of: instructing the selected mobile device to emit an alert signal to assist in locating the mobile device.

24. A mobile device allocation system for securely allocating mobile devices to a plurality of users, comprising:
at least one system backbone;
at least one host computer coupled to the system backbone; and
a plurality of mobile devices operatively configured to communicate to the host computer through the system backbone,
wherein each of the plurality of mobile devices are stored in an inoperative state and in communication with the host computer while in the inoperative state, and the at least one host computer and a selected mobile device are operatively configured to place the selected mobile device in an operative state based upon an identification code accepted as an input by the host computer, said identification code uniquely identifying a user of the plurality of users, and wherein the host computer is operative to customize operation of the selected mobile device to preset preferences of at least one user of the plurality of users such that keys of the mobile device are configured to preset functional preferences of the at least one user.

25. The system of claim 24, further comprising:
at least one secure area, wherein the plurality of mobile devices are stored in the at least one secure area, and the at least one host computer is operatively configured to grant access to the at least one secure area based on the identification code.

26. The system of claim 25, wherein the secure area is a secure room.

27. The system of claim 25, wherein the secure area is a secure enclosure.

28. The system of claim 25, wherein the identification code is selected from the group consisting of numeric codes, alpha-numeric codes, voiceprints, fingerprints and iris patterns.

29. The system of claim 25, further comprising:
a plurality of docking stations located in the at least one secure area, wherein each docking station is coupled to the at least one system backbone, and each mobile device is operatively configured to communicate to the host computer through a respective docking station.

30. The system of claim 29, further comprising:
at least one wireless remote station coupled to the at least one system backbone, wherein each mobile device is operatively configured to communicate to the host computer through the wireless remote station when the respective mobile device is not in the docking station.

31. The system of claim 24, wherein the at least one host computer selects the mobile device to be placed in an operative state based on a preselected criteria.

32. The system of claim 31, wherein the preselected criteria is selected from the group consisting of prior history of use, position within an organization, current battery charge level, and available software on the device.

33. The system of claim 24, wherein the operational mobile device is configured to be operational for a first interval, and upon expiration of the first interval the operational mobile device becomes inoperational.

34. The system of claim 33, wherein the operational mobile device is configured to retain data within a memory area for a second interval, and upon expiration of the second interval all data within the memory area is purged.

35. The system of claim 34, wherein the second interval is inhibited if the mobile device is returned to the secure area prior to the expiration of the second interval.

36. The system of claim 24, wherein the operational mobile device is configured to retain data within a memory area for a second interval, and upon expiration of the second interval all data within the memory area is purged.

37. The system of claim 24, wherein the host computer monitors when an updated revision of mobile device operating software is available, and upon detecting the updated revision of operating software, the host computer transmits the operating software to the selected mobile device.

38. The system of claim 24, wherein the mobile device displays advertisements based on a previous shopping history of the user.

39. The system of claim 24, wherein an alarm is emitted when the user selects an inoperative mobile device.

40. The system of claim 39, wherein the alarm is an audible alarm.

41. The system of claim 39, wherein the alarm is a visual alarm.

42. The system of claim 24, further comprising:
a communication link between a first mobile device and a second mobile device, wherein messages are exchanged over the communications link between the user of the first mobile device and the user of the second mobile device.

43. The system of claim 42, wherein the communications link is a direct communications link from the first mobile device to the second mobile device.

44. The system of claim 42, wherein the communications link is an indirect link from the first mobile device to the second mobile device.

45. The system of claim 44, wherein the indirect communications link includes communicating from the first mobile device to the host computer to the second mobile device.

46. The system of claim 24, wherein the host computer tracks the location of the mobile device as the mobile device moves between a plurality of cells.

47. The system of claim 46, wherein the host computer stores the location of the mobile device in a memory.

48. The system of claim 24, wherein the host computer instructs the mobile device to emit an alert signal to assist in locating the mobile device.

49. The system of claim 24, further comprising:
a remote communication link, wherein at least one mobile device communicates to the host computer through the remote communication link.

50. The system of claim 49, wherein the remote communication link is an internet connection.

51. The system of claim 49, wherein the remote communication link is an intranet connection.

52. The system of claim 49, wherein the remote communication link is a wireless communication link.

53. The method according to claim 1, wherein the host computer customizing operation of the selected mobile device includes performing the customization prior to allocating the selected mobile device.

54. The system according to claim 24, wherein the host computer is operative to customize operation of the selected mobile device prior to allocation of the selected mobile device.

55. A method of securely allocating mobile devices to at least one user, comprising the steps of:
storing a plurality of mobile devices in an inoperative state under the control of a host computer, each of the plurality of mobile devices in communication with the host computer while in the inoperative state;
the host computer accepting as an input an identification code that uniquely identifies the at least one user; and
the host computer selectively placing a mobile device among the plurality of mobile devices in an operative state based on the identification code.

56. The method according to claim 55, wherein storing the plurality of mobile devices in an inoperative state includes electronically locking the plurality of mobile devices.

* * * * *

UNITED STATES PATENT AND TRADEMARK OFFICE
CERTIFICATE OF CORRECTION

| | | |
|---|---|---|
| PATENT NO. | : 7,598,842 B2 | Page 1 of 1 |
| APPLICATION NO. | : 10/682152 | |
| DATED | : October 6, 2009 | |
| INVENTOR(S) | : Landram et al. | |

It is certified that error appears in the above-identified patent and that said Letters Patent is hereby corrected as shown below:

Column 6, Line 66, delete "an" and insert -- a --, therefor.

Column 10, Line 24, delete "wirelessy" and insert -- wirelessly --, therefor.

Signed and Sealed this

Sixteenth Day of February, 2010

David J. Kappos
*Director of the United States Patent and Trademark Office*